US011147090B2

(12) United States Patent
Lunttila et al.

(10) Patent No.: US 11,147,090 B2
(45) Date of Patent: Oct. 12, 2021

(54) DYNAMIC HARQ-ACK CODEBOOK SIZE IN UNLICENSED SPECTRUM

(71) Applicant: Nokia Solutions and Networks Oy, Espoo (FI)

(72) Inventors: Timo Erkki Lunttila, Espoo (FI); Esa Tapani Tiirola, Kempele (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/777,278

(22) PCT Filed: Nov. 16, 2016

(86) PCT No.: PCT/EP2016/077853
§ 371 (c)(1),
(2) Date: May 18, 2018

(87) PCT Pub. No.: WO2017/085122
PCT Pub. Date: May 26, 2017

(65) Prior Publication Data
US 2018/0376490 A1 Dec. 27, 2018

(30) Foreign Application Priority Data

Nov. 19, 2015 (WO) ................. PCT/EP2015/077150

(51) Int. Cl.
*H04W 4/00* (2018.01)
*H04W 72/12* (2009.01)
(Continued)

(52) U.S. Cl.
CPC ....... *H04W 72/1268* (2013.01); *H04L 1/1671* (2013.01); *H04L 1/1812* (2013.01);
(Continued)

(58) Field of Classification Search
CPC . H04W 72/12; H04W 16/14; H04W 72/1289; H04L 1/16; H04L 1/18; H04L 5/00; H04L 1/1822; H04L 1/1896
See application file for complete search history.

(56) References Cited

U.S. PATENT DOCUMENTS

2011/0274059 A1* 11/2011 Brown ................ H04L 27/0008
370/329
2012/0039227 A1* 2/2012 Chen ....................... H04L 5/001
370/311
(Continued)

FOREIGN PATENT DOCUMENTS

CN 103596278 A 2/2014
CN 104284429 A 1/2015
(Continued)

OTHER PUBLICATIONS

3GPP TS 36.213 V12.7.0 (Sep. 2015); 3rd Generation Partnership Project; Technical Specification Group Radio Access Network; Evolved Universal Terrestrial Radio Access (E-UTRA); Physical layer procedures (Release 12).
(Continued)

*Primary Examiner* — Abdelillah Elmejjarmi
(74) *Attorney, Agent, or Firm* — Harrington & Smith

(57) ABSTRACT

A method including receiving one or more data packets wirelessly in one or more downlink transmission opportunities on one or more radio carriers, receiving scheduling information including an indication of uplink control information to be transmitted related to at least one of the one or more data packets, and causing wireless transmission of the uplink control information in an uplink transmission opportunity.

16 Claims, 8 Drawing Sheets

(51) Int. Cl.
*H04L 1/18* (2006.01)
*H04W 16/14* (2009.01)
*H04L 5/00* (2006.01)
*H04L 1/16* (2006.01)

(52) U.S. Cl.
CPC .......... *H04L 1/1854* (2013.01); *H04L 1/1896* (2013.01); *H04L 5/001* (2013.01); *H04L 5/0055* (2013.01); *H04W 16/14* (2013.01); *H04W 72/1289* (2013.01); *H04L 1/1822* (2013.01); *H04L 1/1861* (2013.01); *H04L 5/0048* (2013.01); *H04W 72/121* (2013.01)

(56) References Cited

U.S. PATENT DOCUMENTS

| | | | |
|---|---|---|---|
| 2012/0039280 A1* | 2/2012 | Chen | H04L 1/1861 370/329 |
| 2013/0188533 A1 | 7/2013 | He et al. | |
| 2014/0321395 A1* | 10/2014 | Baldemair | H03M 13/136 370/329 |
| 2015/0280877 A1* | 10/2015 | Chen | H04L 5/0048 370/252 |
| 2017/0034831 A1* | 2/2017 | Yerramalli | H04W 72/08 |
| 2017/0134960 A1 | 5/2017 | Zhang | |
| 2017/0273070 A1* | 9/2017 | Yi | H04L 1/1671 |

FOREIGN PATENT DOCUMENTS

| | | |
|---|---|---|
| CN | 104917597 A | 9/2015 |
| CN | 104955110 A | 9/2015 |
| WO | WO-2013/163611 A2 | 10/2013 |
| WO | WO-2016/123372 A1 | 8/2016 |
| WO | WO 2017055186 A1 | 4/2017 |

OTHER PUBLICATIONS

Nokia Networks, R1-152815, on UL multiplexing in the LAA scenario, 3GPP TSG RAN WG1 Meeting #81, Japan, May 25-29, 2015.

3GPP TS 36.321 V12.7.0. (Sep. 2015), "$3^{rd}$ Generation Partnership Project; Technical Specification Group Radio Access Network; Evolved Universal Terrestrial Radio Access (E-UTRA); Medium Access Control (MAC) protocol specification (Release 12)", 77 pgs.

3GPP TSG-RAN WG1 Meeting #82, Beijing, P.R. China, Aug. 24-28, 2015, R1-154444, "On HARQ-ACK Feedback Enhancements", Nokia Networks, 5 pgs.

3GPP TSG RAN WG1 Meeting #82bis, Malmo, Sweden, Oct. 5-9, 2015, R1-155639, "HARQ-ACK bit interleaving and scrambling", Huawei, HiSilicon, 5 pgs.

3GPP TSG RAN WG1 Meeting #83, Anaheim, USA, Nov. 15-22, 2015, R1-156452, "Remaining issues for dynamic HARQ-ACK codebook determination", Huawei, HiSilicon, 11 pgs.

CATR; "Discussions on the functionalities of DL transmission for LAA"; R1-150599; 3GPP TSG RAN WG1 Meeting #80; Athens, Greece; Feb. 9-13, 2015; whole document (4 pages).

* cited by examiner

DYNAMIC HARQ-ACK CODEBOOK SIZE IN UNLICENSED SPECTRUM

FIELD

The present invention relates to the field of wireless communications. More specifically, the present invention relates to methods, apparatus, systems and computer programs for transmission of uplink control information in unlicensed spectrum.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters, which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimizing the 3GPP LTE radio access technologies.

Communication systems may be configured to use a mechanism for aggregating radio carriers to support wider transmission bandwidth. In LTE this mechanism is referred to as carrier aggregation (CA) and can, according to LTE Rel. 12 specifications, support a transmission bandwidth up to 100 MHz. A communication device with reception and/or transmission capabilities for CA can simultaneously receive and/or transmit on multiple component carriers (CCs) corresponding to multiple serving cells, for which the communication device has acquired/monitors system information needed for initiating connection establishment. When CA is configured, the communication device has only one radio resource control (RRC) connection with the network. At RRC connection establishment/reestablishment or handover, one serving cell provides the non-access stratum (NAS) mobility information, such as tracking area identity information. At RRC connection (re)establishment or handover, one serving cell provides the security input. This cell is referred to as the primary serving cell (PCell), and other cells are referred to as the secondary serving cells (SCells). Depending on capabilities of the communication device, SCells can be configured to form together with the PCell a set of serving cells under CA. In the downlink, the carrier corresponding to the PCell is the downlink primary component carrier (DL PCC), while in the uplink it is the uplink primary component carrier (UL PCC). A SCell needs to be configured by the network using RRC signaling before usage in order to provide necessary information, such as DL radio carrier frequency and physical cell identity (PCI) information, to the communication device. A SCell for which such necessary information has been provided to a communication device is referred to as configured cell for this communication device. The information available at the communication device after cell configuration is in particular sufficient for carrying out cell measurements. A configured SCell is in a deactivated state after cell configuration for energy saving. When a SCell is deactivated, the communication device does in particular not monitor/receive the physical dedicated control channel (PDCCH) or enhanced physical dedicated control channel (EPDCCH) or physical downlink shared channel (PDSCH) in the SCell. In other words the communication device cannot communicate in a SCell after cell configuration, and the SCell needs to be activated before data transmission from/the communication device can be initiated in the SCell. LTE provides for a mechanism for activation and deactivation of SCells via media access control (MAC) control elements to the communication device.

Communication systems may be configured to support simultaneous communication with two or more access nodes. In LTE this mechanism is referred to as dual connectivity (DC). More specifically, a communication device may be configured in LTE to communicate with a master eNB (MeNB) and a secondary eNB (SeNB). The MeNB may typically provide access to a macrocell, while the SeNB may provide on a different radio carrier access to a relatively small cell, such as a picocell. Only the MeNB maintains for the communication device in DC mode a connection via an S1-MME interface with the mobility management entity (MME), that is, only the MeNB is involved in mobility management procedures related to a communication device in DC mode. LTE supports two different user plane architectures for communication devices in DC mode. In the first architecture (split bearer) only the MeNB is connected via an S1-U interface to the serving gateway (S-GW) and the user plane data is transferred from the MeNB to the SeNB via an X2 interface. In the second architecture the SeNB is directly connected to the S-GW, and the MeNB is not involved in the transport of user plane data to the SeNB. DC in LTE reuses with respect to the radio interface concepts introduced for CA in LTE. A first group of cells, referred to as master cell group (MCG), can be provided for a communication device by the MeNB and may comprise one PCell and one or more SCells, and a second group of cells, referred to as secondary cell group (SCG), is provided by the SeNB and may comprise a primary SCell (PSCell) with functionality similar to the PCell in the MCG, for example with regard to uplink control signaling from the communication device. This second group of cells may further comprise one or more SCells.

Future networks, such as 5G, may progressively integrate data transmissions of different radio technologies in a communication between one or more access nodes and a communication device. Accordingly, communication devices may be able to operate simultaneously on more than one radio access technology, and carrier aggregation and dual connectivity may not be limited to the use of radio carriers of only one radio access technology. Rather, aggregation of radio carriers according to different radio access technologies and concurrent communication on such aggregated carriers may be supported.

Small cells, such as picocells, may progressively be deployed in future radio access networks to match the increasing demand for system capacity due to the growing population of communication devices and data applications. Integration of radio access technologies and/or a high number of small cells may bring about that a communication device may detect more and more cells in future networks, which are suitable candidates for connection establishment. Enhancements of carrier aggregation and dual connectivity mechanisms may be needed to make best use of these cells in future radio access networks. Such enhancements may allow for an aggregation of a high number of radio carriers at a communication device, for example up to 32 are currently specified in LTE Rel. 13, and in particular an integration of radio carriers operated on unlicensed spectrum.

Aggregation of radio carriers for communication to/from a communication device and simultaneous communication with two or more access nodes may in particular be used for operating cells on unlicensed (license exempt) spectrum. Wireless communication systems may be licensed to operate in particular spectrum bands. A technology, for example LTE, may operate, in addition to a licensed band, in an unlicensed band. LTE operation in the unlicensed spectrum may be based on the LTE Carrier Aggregation (CA) framework where one or more low power secondary cells (SCells) operate in the unlicensed spectrum and may be either downlink-only or contain both uplink (UL) and downlink (DL), and where the primary cell (PCell) operates in the licensed spectrum and can be either LTE Frequency Division Duplex (FDD) or LTE Time Division Duplex (TDD).

Two proposals for operating in unlicensed spectrum are LTE Licensed-Assisted Access (LAA) and LTE in Unlicensed Spectrum (LTE-U). LTE-LAA specified in 3GPP as part of Rel. 13 and LTE-U as defined by the LTE-U Forum may imply that a connection to a licensed band is maintained while using the unlicensed band. Moreover, the licensed and unlicensed bands may be operated together using, e.g., carrier aggregation or dual connectivity. For example, carrier aggregation between a primary cell (PCell) on a licensed band and one or more secondary cells (SCells) on unlicensed band may be applied, and uplink control information of the SCells is communicated in the PCell on licensed spectrum.

In an alternative proposal stand-alone operation using unlicensed carrier only may be used. In standalone operation at least some of the functions for access to cells on unlicensed spectrum and data transmission in these cells are performed without or with only minimum assistance or signaling support from license-based spectrum. Dual connectivity operation for unlicensed bands can be seen as an example of the scenario with minimum assistance or signaling from licensed-based spectrum.

Unlicensed band technologies may need to abide by certain rules, e.g. a clear channel assessment procedure, such as Listen-Before-Talk (LBT), in order to provide fair coexistence between LTE and other technologies such as Wi-Fi as well as between LTE operators. In some jurisdictions respective rules may be specified in regulations.

In LTE-LAA, before being permitted to transmit, a user or an access point (such as eNodeB) may, depending on rules or regulatory requirements, need to perform a Clear Channel Assessment (CCA) procedure, such a Listen-Before-Talk (LBT). The user or access node may, for example, monitor a given radio frequency, i.e. carrier, for a short period of time to ensure that the spectrum is not already occupied by some other transmission. The requirements for CCA procedures, such as LBT, vary depending on the geographic region: e.g. in the US such requirements do not exist, whereas in e.g. Europe and Japan the network elements operating on unlicensed bands need to comply with LBT requirements. Moreover, CCA procedures, such as LBT, may be needed in order to guarantee co-existence with other unlicensed band usage in order to enable e.g. fair co-existence with Wi-Fi also operating on the same spectrum and/or carriers. After a successful CCA procedure the user or access point is allowed to start transmission within a transmission opportunity. The maximum duration of the transmission opportunity may be preconfigured or may be signaled in the system, and may extend over a range of 4 to 13 milliseconds. The access node may be allowed to schedule downlink (DL) transmissions from the access node and uplink (UL) transmissions to the access node within a certain time window. An uplink transmission may not be subject to a CCA procedure, such as LBT, if the time between a DL transmission and a subsequent UL transmission is less than or equal to a predetermined value. Moreover, certain signaling rules, such as Short Control Signaling (SCS) rules defined for Europe by ETSI, may allow for the transmission of control or management information without LBT operation, if the duty cycle of the related signaling does not exceed a certain threshold, e.g. 5%, within a specified period of time, for example 50 ms. The aforementioned SCS rules, for example, can be used by compliant communication devices, referred to as operating in adaptive mode for respective SCS transmission of management and control frames without sensing the channel for the presence of other signals. The term "adaptive mode" is defined in ETSI as a mechanism by which equipment can adapt to its environment by identifying other transmissions present in a band, and addresses a general requirement for efficient operation of communications systems on unlicensed bands. Further, scheduled UL transmissions may in general be allowed without LBT, if the time between a DL transmission from an access node and a subsequent UL transmission is less than or equal to a predetermined value, and the access node has performed a clear channel assessment procedure, such as LBT, prior to the DL transmission. The total transmission time covering both DL transmission and subsequent UL transmission may be limited to a maximum burst or channel occupancy time. The maximum burst or occupancy time may be specified, for example, by a regulator.

Data transmission on an unlicensed band or/and subject to a clear channel assessment procedure cannot occur pursuant to a predetermined schedule in a communication system. Rather, communication devices and access nodes need to determine suitable time windows for uplink transmission and/or downlink transmission. A respective time window may comprise one or more transmission time intervals (TTI), such as subframes in LTE, and is in the following referred to as uplink transmission opportunity or downlink transmission opportunity. A TTI is the time period reserved in a scheduling algorithm for performing a data transmission of a dedicated data unit in the communication system. The determination of uplink transmission opportunities and/or downlink transmission opportunities may be based on parameters related to the communication system, such as a configured pattern governing the sequence of uplink and downlink transmissions in the system. The determination may further be based on rules or regulations specifying a minimum and/or maximum allowed length of uplink transmissions and/or downlink transmissions. The determination of uplink and downlink opportunities may in particular be based on the outcome of a clear channel assessment procedure, and communication devices or access nodes will only start data transmission on a frequency band after having assessed that the frequency band is clear, that is, not occupied by data transmissions from other communication devices or access nodes. Further rules or regulations may govern data transmissions in a communication between an access node and one or more communication devices. These rules may, for example, specify a maximum length of a time window in the communication covering at least one transmission in a first direction, for example in DL in a cellular system from an access node of a cell, and at least one subsequent transmission in the reverse direction, for example in UL from one or more communication devices in the cell. Such a time window comprising one or more DL and UL transmissions is in the following referred to as communication opportunity. DL transmissions may comprise scheduling information which may be transmitted on a DL control channel. The scheduling information may in particular be used for scheduling one or more UL data transmissions and/or one or more DL data transmissions within the current one or more future communication opportunities.

Scheduling information for a data transmission is indicative of an assignment of contents attributes, format attributes and mapping attributes to the data transmission. Mapping attributes relate to one or more channel elements allocated to the transmission on the physical layer. Specifics of the channel elements depend on the radio access technology and may depend on the used channel type. A channel element may relate to a group of resource elements, while each resource element relates to a frequency attribute, for example a subcarrier index (and the respective frequency range) in a system employing orthogonal frequency-division multiplexing (OFDM), and a time attribute, such as the transmission time of an OFDM or Single-Carrier FDMA symbol. A channel element may further relate to a code attribute, such as a cover code or a spreading code, which may allow for parallel data transmission on the same set of resource elements. Illustrative examples for channel elements in LTE are control channel elements (CCE) on the physical downlink control channel (PDCCH) or the enhanced physical downlink control channel (EPDCCH), PUCCH resources on the physical uplink control channel (PUCCH), and physical resource blocks (PRB) on the physical downlink shared channel (PDSCH) and the physical uplink shared channel (PUSCH). It should be understood that each data transmission is associated with the code attributes of the allocated channel elements and the frequency and time attributes of the resource elements in the allocated channel elements. Format attributes relate to the processing of a set of information bits in the transmission prior to the mapping to the allocated channel elements. Format attributes may in particular comprise a modulation and coding scheme used in the transmission and the length of the transport block in the transmission. Contents attributes relate to the user/payload information conveyed through the transmission. In other words, a contents attribute is any information, which may in an application finally affect the arrangement of a detected data sequence at the receiving end. Contents attributes may comprise the sender and/or the receiver of the transmission. Contents attributes may further relate to the information bits processed in the transmission, for example some kind of sequence number in a communication. Contents attributes may in particular indicate whether the transmission is a retransmission or relates to a new set of information bits. In case of a hybrid automatic repeat request (HARQ) scheme contents attributes may in particular comprise an indication of the HARQ process number, that is, a HARQ-specific sequence number, the redundancy version (RV) used in the transmission and a new data indicator (NDI).

Scheduling information for a data transmission need not comprise assignment information for the complete set of attributes needed in the data transmission. At least a part of the attributes can be preconfigured, for example through semi-persistent scheduling, and can be used in more than one data transmission. Some of the attributes may be signaled implicitly or may be derivable, for example from timing information. However, dynamic scheduling in a more complex system, such as a cellular mobile network, requires transmission of scheduling information on a DL control channel. In a system employing carrier aggregation the DL scheduling information related to a certain data transmission may be transmitted on a component carrier other than the data transmission. Transmission of a data and scheduling information on different component carriers is referred to as cross-carrier scheduling.

In a cell operated on unlicensed spectrum a communication device may start monitoring channel elements related to a DL control channel carrying scheduling information after detection of DL data burst or subframe in the cell. The detection of the DL data burst or subframe may be based on the detection of a certain signal in the cell, for example a reference signal, such as a cell reference signal which the communication device may blindly detect, or based on explicit signaling indicative of the presence of the DL data burst (such as common DCI). Monitoring channel elements related to a DL control channel may comprise blind detection of scheduling information destined to the communication device. The control channel may be a physical downlink control channel (PDCCH) or enhanced physical downlink control channel (EPDCCH) as specified in LTE or a similar channel. The communication device may further detect a DL data transmission on a data channel, such as a physical downlink shared channel (PDSCH) or a similar channel, based on the detected scheduling information.

A communication system may employ a retransmission mechanism, such as Automatic Repeat Request (ARQ), for handling transmission errors. A receiver in such a system may use an error-detection code, such as a Cyclic Redundancy Check (CRC), to verify whether a data packet was received in error. The receiver may notify the transmitter on a feedback channel of the outcome of the verification by sending an acknowledgement (ACK) if the data packet was correctly received or a non-acknowledgement (NACK) if an error was detected. The transmitter may subsequently transmit a new data packet related to other information bits, in case of an ACK, or retransmit the data packet received in error, in case of a NACK. The retransmission mechanism may be combined with forward error-correction coding (FEC), in which redundancy information is included in the data packet prior to transmission. This redundancy information can be used at the receiver for correcting at least some of the transmission errors, and retransmission of a data packet is only requested in case of uncorrectable errors. Such a combination of FEC and ARQ is referred to as hybrid automatic repeat request (HARQ). In a HARQ scheme the receiver may not simply discard a data packet with uncorrectable errors, but may combine obtained information with information from one or more retransmissions related to the same information bits. These retransmissions may contain identical copies of the first transmission. In more advanced schemes, such as incremental redundancy (IR) HARQ, the first transmission and related retransmissions are not identical. Rather, the various transmissions related to the same information bits may comprise different redundancy versions (RV), and each retransmission makes additional redundancy information available at the receiver for data detection. The number of transmissions related to the same information bits may be limited in a communication system by a maximum number of not successful transmissions, and a data packet related to new information bits may be transmitted once the maximum number of not successful transmissions has been reached. A scheduling grant may comprise a new data indicator (NDI) notifying a communication device whether the scheduled transmission is destined for a data packet related to new information bits. Further or alternatively, the scheduling grant may comprise an indication of the redundancy version (RV) used or to be used in the transmission. Each data packet, often referred to as transport block, may be transmitted in a communication system within a transmission time interval (TTI), such as a subframe in LTE. At least two transport blocks may be transmitted in parallel in a TTI when spatial multiplexing is employed. Processing of a transport block, its transmission and the processing and transmission of the corresponding HARQ-ACK feedback may take several TTIs. For example, in LTE-FDD such a complete HARQ loop takes eight subframes. Accordingly, eight HARQ processes are needed in a data stream in LTE-FDD for continuous transmission between an access node and a communication device. The HARQ processes are handled in the access nodes and the communication devices in parallel, and each HARQ process controls the transmission of transport blocks and ACK/NACK feedback related to a set of information bits in the data stream.

In a conventional LTE system HARQ-ACK feedback is communicated in UL according to a predefined timing in relation to the transmission time interval in which a transport block has been transmitted in DL. Specifically, HARQ-ACK feedback is transmitted by a communication device in subframe n for a DL transport block intended for the communication device and transmitted/detected on PDSCH (Physical Downlink Shared Channel) in subframe n–k. The minimum value for the HARQ-ACK delay k is four subframes in a conventional LTE system, which allows for sufficient time to receive and decode the DL transport block by a communication device, and for preparing the corresponding HARQ-ACK transmission in UL. In FDD mode, HARQ-ACK delay is fixed in 3GPP specification TS 36.213 to the minimum value of four subframes. In other words, when a transport block intended for a communication device is detected on PDSCH by the communication device in subframe n–4, the corresponding HARQ-ACK message is transmitted in subframe n by the communication device. In TDD mode, the HARQ-ACK delay k depends on the selected UL/DL configuration as well as the subframe number in which the transport block is transmitted on PDSCH. The relationship is given by means of the DL association set index K, shown in Table 1 and specified in 3GPP specification TS 36.213. In other words, when one or more transport blocks on PDSCH intended for a communication device are detected by the communication device within subframe(s) n–k (where k∈K and K as specified in Table 1), the corresponding HARQ-ACK message is transmitted in subframe n by the communication device.

TABLE 1

Downlink association set index K: $\{k_0, k_1, \ldots k_{M-1}\}$ for LTE-TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

As discussed above, HARQ-ACK feedback is transmitted in a conventional LTE system by a communication device in subframe n for a DL transport block intended for the communication device and transmitted on PDSCH in subframe n–k. However, such a predetermined association between DL data transmissions and HARQ-ACK messages is not longer applicable (or at least such an approach cannot be the only solution to convey HARQ-ACK), due to LBT requirements and/or channel availability problems, when HARQ-ACK messages are communicated on unlicensed bands.

Signal transmissions on unlicensed spectrum may need to occupy effectively the whole of the nominal channel bandwidth, so as to ensure reliable operation with LBT. For example, the ETSI standards set strict requirements for the occupied channel bandwidth ("According to ETSI regulation, the Occupied Channel Bandwidth, defined to be the bandwidth containing 99% of the power of the signal, shall be between 80% and 100% of the declared Nominal Channel Bandwidth."). With a nominal channel bandwidth of a radio carrier of for example 20 MHz in a LTE-LAA system, this means that a transmission should have a bandwidth of at least 0.80*20 MHz=16 MHz.

This means that UL transmissions such as PUCCH and PUSCH are required to occupy a large bandwidth, which is possible by using interleaved frequency division multiple access (IFDMA), block-IFDMA, or contiguous resource allocation. The main drawback with such large bandwidths in the UL direction of transmission is that respective allocations comprise a large number of resource elements. For example, an IFDMA allocation occupying every 24th subcarrier in an LTE-based system using legacy subframe duration of 1 ms would comprise 50×14=700 resource elements on a 20 MHz carrier for normal cyclic prefix length. Such an allocation may be too large, for example, when only few HARQ-ACK bits need to be transmitted. This may motivate transmission of PUCCH ("Short PUCCH") only in a part of a transmission time interval, and consequently application of time division multiplexing (TDM) between different channels such as PUCCH and PUSCH. TDM of UL channels may be feasible in particular in small cells, because a communication device may not become power limited even when using large bandwidth allocations.

However, LBT may from time to time prevent the UE from accessing the channel. It may therefore not be possible to transmit HARQ-ACK information for some of the DL transport blocks of a DL communication opportunity in the following UL communication opportunity. It such a situation a larger feedback container may be beneficial, so as to allow for a transmission of all HARQ-ACKs, including the HARQ-ACK bits being delayed due to the failed LBT, in an upcoming UL transmission opportunity. There may be also a need to multiplex other bits, such as channel state information (CSI) bits with the HARQ-ACK bits in the same control-signalling message. This increases the need for a larger feedback container. Therefore, there is a need for a flexible signalling scheme for HARQ-ACK feedback information from a communication device to an access node. There is in particular a need for a signalling scheme, which permits adjusting the size of the HARQ-ACK feedback information according to current needs.

SUMMARY

In a first aspect, there is provided a method comprising receiving one or more data packets wirelessly in one or more downlink transmission opportunities on one or more radio carriers. The method further comprising receiving scheduling information comprising an indication of uplink control information to be transmitted related to at least one of the one or more data packets, and further causing wireless transmission of the uplink control information in an uplink transmission opportunity.

The transmission of the uplink control information may comprise at least one of:
 first transmission using one or more resource elements reserved for uplink control information,
 second transmission using one or more resource elements shared between uplink control information and uplink user data.

At least a part of the uplink control information may be multiplexed with uplink user data in the second transmission.

At least a part of the uplink control information may be transmitted in the second transmission, without uplink user data being included in the second transmission.

The scheduling information may comprise an indication controlling use of first transmission and/or second transmission in the transmission of the uplink control information.

The uplink control information may comprise feedback information of a hybrid automatic repeat request scheme relating to at least one of the radio carriers and one or more data packets transmitted on the at least one radio carrier in one or more downlink transmission opportunities.

The size of the feedback information may be determined according to the number of processes of the hybrid automatic repeat request scheme or according to a maximum number of processes of the hybrid automatic repeat request scheme.

The size of the feedback information may be determined based on the scheduling information.

The feedback information in a process of the hybrid automatic repeat request scheme may comprise an indication to which data packet transmitted in the process the feedback information relates to.

The feedback information in the hybrid automatic repeat request scheme may comprise an indication of the number of data packets or transmissions of scheduling information transmitted in the processes the feedback information relates to.

The scheduling information may comprise at least one of:
 an indication of the at least one of the radio carriers,
 an indication of one or more processes of a hybrid automatic repeat request scheme indicating one or more data packets transmitted on the at least one radio carrier to be covered by the feedback information
 an indication of the process of a hybrid automatic repeat request scheme indicating the last transmitted of the one or more data packets transmitted on the at least one radio carrier to be covered by the feedback information,
 an indication of the process of a hybrid automatic repeat request scheme indicating the first transmitted of the one or more data packets transmitted on the at least one radio carrier to be covered by the feedback information,
 a time window indicating the transmission time intervals of the first and the last transmitted of the one or more data packets transmitted on the at least one radio carrier to be covered by the feedback information.

The feedback information for hybrid automatic repeat request relating to at least one of the radio carriers may comprise at least feedback information for data packets transmitted on the at least one radio carrier in the transmission time interval in which the scheduling information was received.

The method may further comprise bundling of feedback information relating to one or more of the one or more data packets, wherein bundling may be performed separately for data packets within each downlink transmission opportunity.

The method may further comprise determining the process of a hybrid automatic repeat request scheme to which the first transmitted of the one or more data packets transmitted on the at least one radio carrier relates based on one or more of:
 an indication of the process of a hybrid automatic repeat request scheme to which the last transmitted of the one or more data packets transmitted on the at least one radio carrier relates,
 the resource elements for the first transmission,
 free resource elements for the second transmission,
 subframe index for the second transmission,
 the number of data packets provided per transmission time interval, the outcome of a clear channel assessment procedure on resource elements of the first transmission, the number of data packets for which no feedback information has been provided in a previous uplink transmission opportunity.

The method may further comprise determining the process of a hybrid automatic repeat request scheme to which the last transmitted of the one or more data packets transmitted on the at least one radio carrier relates based on one or more of:

an indication of the process of a hybrid automatic repeat request scheme to which the first transmitted of the one or more data packets transmitted on the at least one radio carrier relates, the number of resource elements for the first transmission, free resources elements for the second transmission, subframe index for the second transmission, the number of data packets provided per transmission time interval, the outcome of a clear channel assessment procedure on resource elements of the first transmission, the number of data packets for which no feedback information has been provided in a previous uplink transmission opportunity.

Feedback information indicative of successful reception of a data packet may be provided only once per data packet.

Feedback information indicative of not successful reception of a data packet may be provided if feedback information indicative of successful reception of the data packet was provided in previous feedback information.

The feedback information may be split in at least two parts and the at least two parts being transmitted in different transmission time intervals of the uplink transmission opportunity.

The scheduling information may comprise a notification of absence of user data in the second transmission.

The notification may comprise an identifier associated with a specific modulation and coding scheme.

The uplink control information may further comprise channel state information.

The scheduling information may be indicative of a code division multiplexing scheme or code division multiplexing resource to be used in the transmission of at least a part of the uplink control information.

The code division multiplexing scheme may relate to a scheme for interleaved frequency division multiple access or block interleaved frequency division multiple access across one or more transmission time intervals of the uplink transmission opportunity.

The code division multiplexing scheme may be based on a cyclic shift code and/or an orthogonal cover code.

The code for code division multiplexing may relate to a cyclic shift index of a de-modulation reference signal provided in the scheduling information.

The scheduling information may be provided in a uplink scheduling grant or a downlink scheduling grant.

In a second aspect, there is provided a method comprising causing wireless transmission of one or more data packets in one or more downlink transmission opportunities on one or more radio carriers. The method further comprising causing transmission of scheduling information comprising an indication of uplink control information to be transmitted related to at least one of the one or more data packets, and receiving the uplink control information wirelessly in an uplink transmission opportunity.

The receiving of the uplink control information may comprise at least one of:

receiving a first transmission using one or more resource elements reserved for uplink control information, receiving a second transmission using one or more resource elements shared between uplink control information and uplink user data.

At least a part of the uplink control information may be multiplexed with uplink user data in the second transmission.

At least a part of the uplink control information may be transmitted in the second transmission, without uplink user data being included in the second transmission.

The scheduling information may comprise an indication controlling use of first transmission and/or second transmission in the transmission of the uplink control information.

The uplink control information may comprise feedback information of a hybrid automatic repeat request scheme relating to at least one of the radio carriers and one or more data packets transmitted on the at least one radio carrier in one or more downlink transmission opportunities.

The size of the feedback information may be determined according to the number of processes of the hybrid automatic repeat request scheme or according to a maximum number of processes of the hybrid automatic repeat request scheme.

The size of the feedback information may be determined based on the scheduling information.

The feedback information in a process of the hybrid automatic repeat request scheme may comprises an indication to which data packet transmitted in the process the feedback information relates to.

The feedback information in the hybrid automatic repeat request scheme may comprise an indication of the number of data packets or transmissions of scheduling information transmitted in the processes the feedback information relates to.

The scheduling information may comprises at least one of:

an indication of the at least one of the radio carriers, an indication of one or more processes of a hybrid automatic repeat request scheme indicating one or more data packets transmitted on the at least one radio carrier to be covered by the feedback information an indication of the process of a hybrid automatic repeat request scheme indicating the last transmitted of the one or more data packets transmitted on the at least one radio carrier to be covered by the feedback information, an indication of the process of a hybrid automatic repeat request scheme indicating the first transmitted of the one or more data packets transmitted on the at least one radio carrier to be covered by the feedback information, a time window indicating the transmission time intervals of the first and the last transmitted of the one or more data packets transmitted on the at least one radio carrier to be covered by the feedback information.

The feedback information for hybrid automatic repeat request relating to at least one of the radio carriers may comprise at least feedback information for data packets transmitted on the at least one radio carrier in the transmission time interval in which the scheduling information was received.

The method may further comprise receiving bundled feedback information relating to one or more of the one or more data packets, wherein bundling is performed separately for data packets within each downlink transmission opportunity.

The method may further comprise determining the process of a hybrid automatic repeat request scheme to which the first transmitted of the one or more data packets transmitted on the at least one radio carrier relates based on one or more of:

an indication of the process of a hybrid automatic repeat request scheme to which the last transmitted of the one or more data packets transmitted on the at least one radio carrier relates,
the resource elements for the first transmission,
free resource elements for the second transmission,
subframe index for the second transmission,
the number of data packets provided per transmission time interval,
the outcome of a clear channel assessment procedure on resource elements of the first transmission,
the number of data packets for which no feedback information has been provided in a previous uplink transmission opportunity.

The method may further comprise determining the process of a hybrid automatic repeat request scheme to which the last transmitted of the one or more data packets transmitted on the at least one radio carrier relates based on one or more of:

an indication of the process of a hybrid automatic repeat request scheme to which the first transmitted of the one or more data packets transmitted on the at least one radio carrier relates,
the number of resource elements for the first transmission,
free resources elements for the second transmission,
subframe index for the second transmission,
the number of data packets provided per transmission time interval,
the outcome of a clear channel assessment procedure on resource elements of the first transmission,
the number of data packets for which no feedback information has been provided in a previous uplink transmission opportunity.

Feedback information indicative of successful reception of a data packet may be provided only once per data packet.

Feedback information indicative of not successful reception of a data packet may be provided if feedback information indicative of successful reception of the data packet was provided in previous feedback information.

The feedback information may be split in at least two parts and the at least two parts being transmitted in different transmission time intervals of the uplink transmission opportunity.

The scheduling information may comprise a notification of absence of user data in the second transmission.

The notification may comprise an identifier associated with a specific modulation and coding scheme.

The uplink control information may further comprises channel state information.

The scheduling information may be indicative of a code division multiplexing scheme or code division multiplexing resource to be used in the transmission of at least a part of the uplink control information.

The code division multiplexing scheme may relate to a scheme for interleaved frequency division multiple access or block interleaved frequency division multiple access across one or more transmission time intervals of the uplink transmission opportunity.

The code division multiplexing scheme may be based on a cyclic shift code and/or an orthogonal cover code.

The code for code division multiplexing may relate to a cyclic shift index of a de-modulation reference signal provided in the scheduling information.

The scheduling information may be provided in a uplink scheduling grant or a downlink scheduling grant.

In a third aspect, there is provided an apparatus, said apparatus comprising at least one processor; and at least one memory including computer program code, the at least one memory and the computer program code configured, with the at least one processor, to cause the apparatus at least to receive one or more data packets wirelessly in one or more downlink transmission opportunities on one or more radio carriers. The at least one memory and the computer program code further configured, with the at least one processor, to cause the apparatus at least to receive scheduling information comprising an indication of uplink control information to be transmitted related to at least one of the one or more data packets, and cause wireless transmission of the uplink control information in an uplink transmission opportunity.

In a forth aspect, there is provided an apparatus, said apparatus comprising at least one processor; and at least one memory including computer program code, the at least one memory and the computer program code configured, with the at least one processor, to cause the apparatus at least to cause wireless transmission of one or more data packets in one or more downlink transmission opportunities on one or more radio carriers. The at least one memory and the computer program code further configured, with the at least one processor, to cause the apparatus at least to cause transmission of scheduling information comprising an indication of uplink control information to be transmitted related to at least one of the one or more data packets, and receive the uplink control information wirelessly in an uplink transmission opportunity.

In a fifth aspect, there is provided an apparatus comprising means for performing a method according to embodiments of the first aspect.

In a sixth aspect, there is provided an apparatus comprising means for performing a method according to embodiments of the second aspect.

In a seventh aspect, there is provided a computer program embodied on a non-transitory computer-readable storage medium, the computer program comprising program code for controlling a process to execute a process, the process comprising receiving one or more data packets wirelessly in one or more downlink transmission opportunities on one or more radio carriers. The process further comprising receiving scheduling information comprising an indication of uplink control information to be transmitted related to at least one of the one or more data packets, and causing wireless transmission of the uplink control information in an uplink transmission opportunity.

In an eighth aspect, there is provided a computer program embodied on a non-transitory computer-readable storage medium, the computer program comprising program code for controlling a process to execute a process, the process comprising causing wireless transmission of one or more data packets in one or more downlink transmission opportunities on one or more radio carriers. The process further comprising causing transmission of scheduling information comprising an indication of uplink control information to be transmitted related to at least one of the one or more data packets, and receiving the uplink control information wirelessly in an uplink transmission opportunity.

In a ninth aspect, there is provided a computer program product for a computer, comprising software code portions for performing the steps of a method according to embodiments of the first aspect.

In a tenth aspect, there is provided a computer program product for a computer, comprising software code portions for performing the steps of a method according to embodiments of the second aspect.

In an eleventh aspect, there is provided a mobile communication system comprising at least one apparatus according to the third aspect and at least one apparatus according to the forth aspect.

In a twelfth aspect, there is provided a mobile communication system comprising at least one apparatus according to the fifth aspect and at least one apparatus according to the sixth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
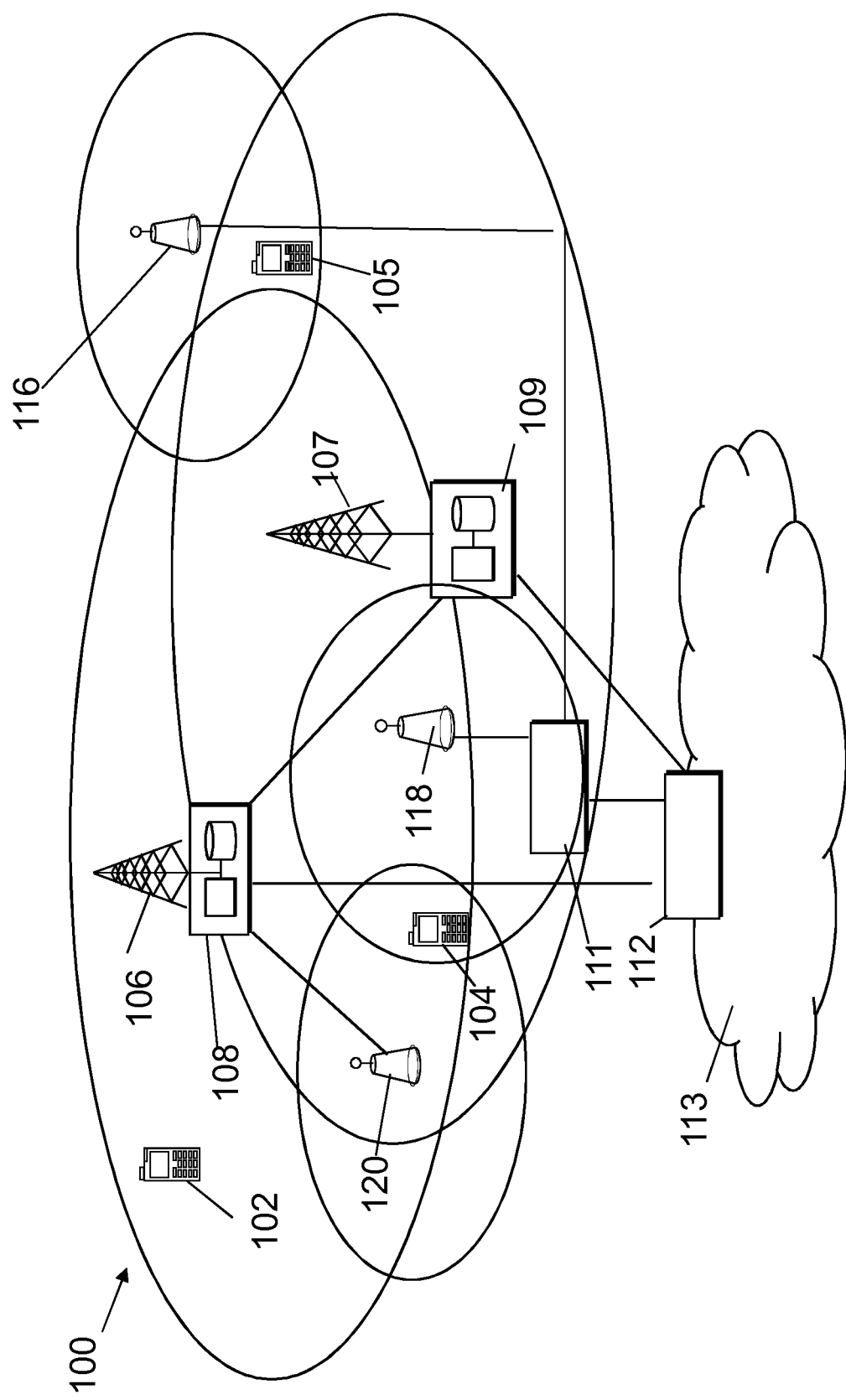
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
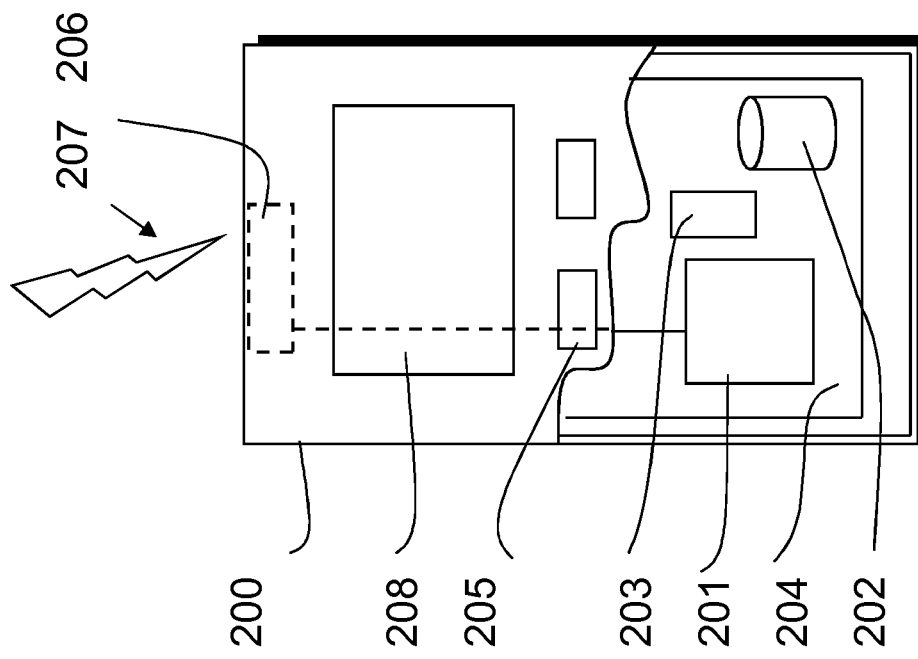
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on. Signaling mechanisms and procedures, which may enable a device to address in-device coexistence (IDC) issues caused by multiple transceivers, may be provided with help from the LTE network. The multiple transceivers may be configured for providing radio access to different radio technologies.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

As discussed above, there is a need for a flexible signalling scheme for HARQ-ACK feedback information from a communication device to an access node. There is in particular a need for a signalling scheme, which permits adjusting the size of the HARQ-ACK feedback information according to current needs.

Such a scheme may comprise the transmission of scheduling information comprising an indication of uplink control information to be transmitted in an uplink transmission opportunity. The scheduling information in such a scheme may in particular schedule the transmission of HARQ ACK feedback information related to a group of HARQ processes. The transmission of HARQ feedback information for such a group of HARQ processes is in the following referred to as HARQ group acknowledgement.

The beneficial effect of such a scheme is to be seen in that it allows for a control of the size and the content of the uplink control message. The scheme allows in particular to control the HARQ codebook size, i.e. the size of the data container carrying provided HARQ-ACK feedback information. The scheme permits controlling the retransmission of uplink control information, for example, if the communication device had to drop a respective transmission due to CCA/LBT problems on resources of an uplink control channel. The scheme may further comprise mechanisms for avoiding ACK/NACK misdetection problems when HARQ-ACK feedback information related to a data block (transport block) is retransmitted in a HARQ process.

Figure 3:
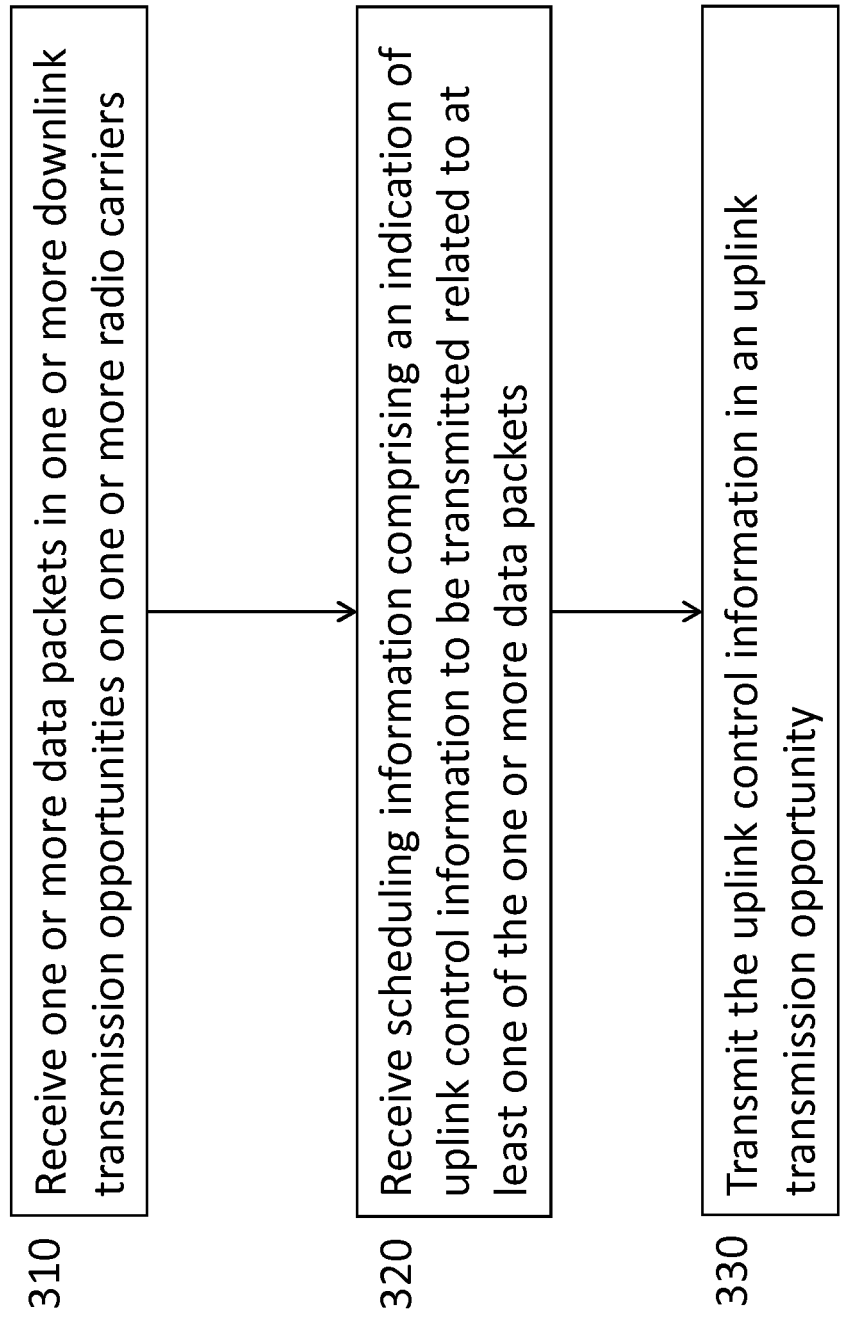
FIG. 3 shows an example method of a mobile communication device for communicating uplink control information.

FIG. 3 shows an example method of a communication device for communicating uplink control information;

At step 310, the communication device monitors a DL control channel, such as PDCCH or EPDCCH in LTE, and determines whether a DL data burst contains at least one DL data packet (transport block) intended for the communication device. The communication device may receive DL data packets in DL data bursts transmitted on one or more radio carriers. The communication device may store uplink control information related to received data packets. The communication device may have received these data packets in one or more downlink transmission opportunities. The method proceeds to step 320.

At step 320, the communication device receives scheduling information comprising an indication of uplink control information to be transmitted from the communication device. The uplink control information may in particular relate to one or more of the received data packets. The method proceeds to step 330.

At step 330, the communication device transmits the requested uplink control information according to the received scheduling information in an uplink transmission opportunity.

Figure 4:
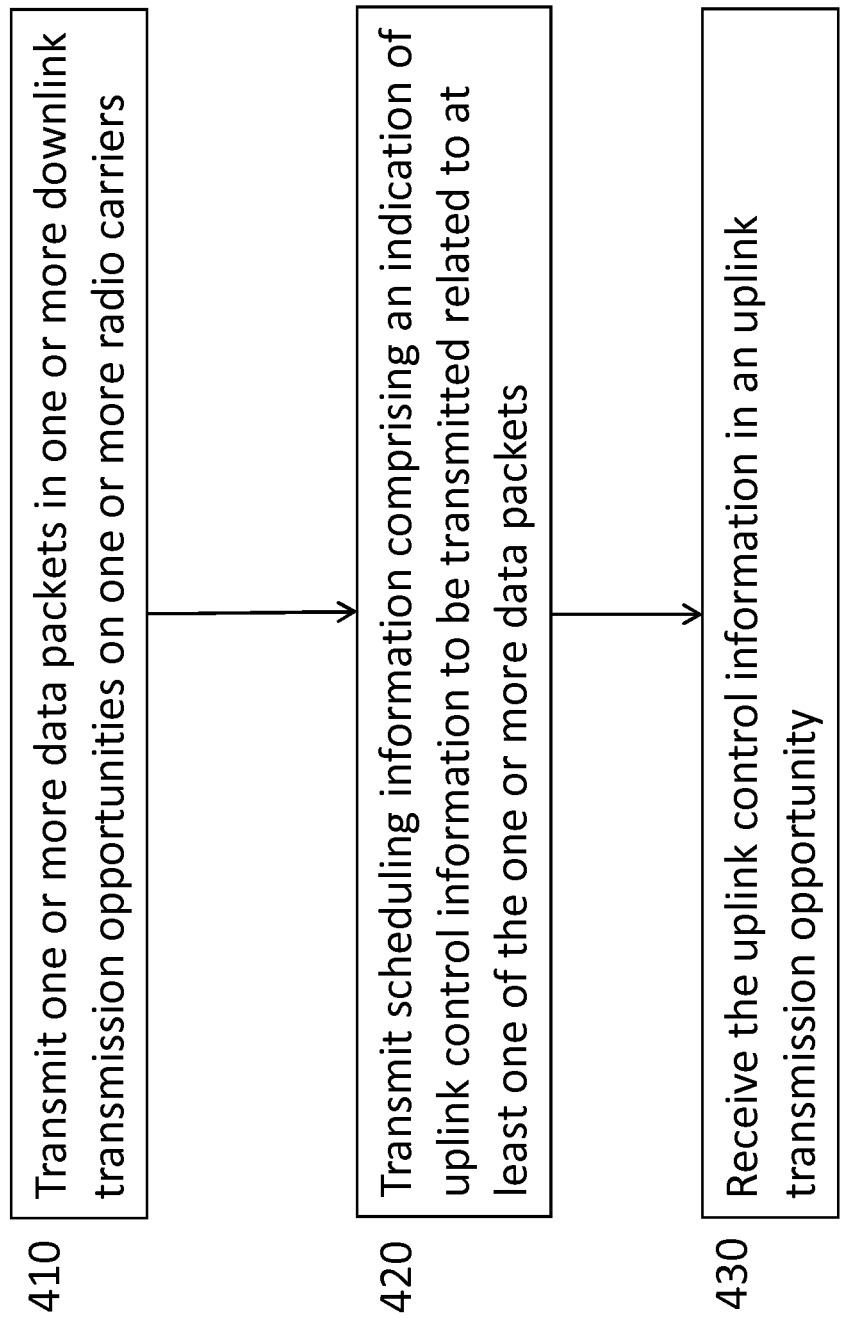
FIG. 4 shows an example method of an access node for communicating uplink control information.

FIG. 4 shows an example method of an access node for communicating uplink control information;

At step 410, the access node transmits data packets (transport blocks) on a data channel, such as the PDSCH in LTE, to a communication device. The access node may transmit DL data packets on one or more radio carriers to the communication device. The access node may transmit these DL data packets in one or more downlink transmission opportunities. The access node may further transmit downlink control information on a downlink control channel, such as PDCCH or EPDCCH in LTE, to notify the communication device of data packets intended for the communication device. The method proceeds to step 420.

At step 420, the access node transmits scheduling information comprising an indication of uplink control information to be transmitted from the communication device. This scheduling information may be provided on a downlink control channel, such as PDCCH or EPDCCH in LTE. The uplink control information may in particular relate to one or more of the transmitted data packets. The method proceeds to step 430.

At step 430, the access node receives (or tries to detect) the requested uplink control information in an uplink transmission opportunity according to the scheduling information provided in step 420.

The transmission of the uplink control information in steps 330 and 430 may comprise a first transmission using one or more resource elements reserved for uplink control information. The communication device may use the reserved resources for transmitting a short PUCCH. The short PUCCH transmission may directly follow a DL data burst or downlink transmission opportunity. A transmission time interval comprising a first transmission, for example a short PUCCH, need not contain a data part or data channel, such as the PUSCH in LTE.

The transmission of uplink control information in steps 330 and 430 may comprise a second transmission using one or more resource elements shared between uplink control information and uplink user data. The communication device may transmit uplink control information using the shared resource elements on shared uplink data channel, such as the PUSCH in LTE.

At least a part of the uplink control information may be multiplexed with uplink user data in the second transmission, for example on a PUSCH in an LTE-based system.

At least a part of the uplink control information may be transmitted in the second transmission, without uplink user data being included in the second transmission. In such a case the whole data part, for example the whole PUSCH in an LTE-based system, may be available for transmission of uplink control information.

The scheduling information of steps 320 and 420 may comprise an indication controlling use of first transmission and/or second transmission in the transmission of the uplink control information. Such an indication may comprise 1 or 2 bits or at least two code points. One of the code points may indicate that Short PUCCH carrying HARQ group acknowledgement is to be transmitted prior to the start of the second transmission on the shared resources. Other code points may indicate that HARQ group acknowledgement is to be transmitted only or additionally on the shared resources in the second transmission. Other code points may indicate which uplink control information is to be transmitted. The communication device may for example include channel state information or reservation signals in the first and/or the second transmission. The scheduling information may in particular comprise a bitmap, indicating the radio carriers for which HARQ feedback information is to be transmitted.

The uplink control information of step 330 and 430 may comprise feedback information of a hybrid automatic repeat request scheme relating to at least one of the radio carriers and one or more data packets transmitted on the at least one radio carrier in one or more downlink transmission opportunities.

The size of the feedback information, i.e. the size of the HARQ codebook, may be determined according to the number of processes of the hybrid automatic repeat request scheme or according to a maximum number of processes of the hybrid automatic repeat request scheme. The maximum number of HARQ processes may be defined by the specification and it may be a feature related to the category of the communication device. The maximum number of HARQ processes may be configured by the access node, for example, by using higher layer signaling.

The size of the feedback information may be determined based on the scheduling information. The communication device may in particular determine the number of active HARQ processes based the request HARQ feedback information.

The feedback information in a process of the hybrid automatic repeat request scheme may comprise an indication indicative of the data packet in the process the feedback information relates to. The communication device may include in the HARQ feedback information additional information indicative of the data packet the ACK/NACK HARQ feedback information relates to. The communication device may include the additional information only when it is reporting an ACK for successful detection of a data packet. The additional information may be indicative of a sequence number of the data packet in the process. The additional information may comprise at least the least significant bit of such a sequence number. The additional information may in particular comprise the new data indicator (NDI) provided in the downlink assignment information for the data packet. It may also indicate the the number of data packets or transmissions of scheduling information transmitted in the processes the feedback information relates to.

The scheduling information may comprise at least one of:
an indication of the at least one of the radio carriers,
an indication of one or more processes of a hybrid automatic repeat request scheme indicating one or more data packets transmitted on the at least one radio carrier to be covered by the feedback information
an indication of the process of a hybrid automatic repeat request scheme indicating the last transmitted of the one or more data packets transmitted on the at least one radio carrier to be covered by the feedback information,
an indication of the process of a hybrid automatic repeat request scheme indicating the first transmitted of the one or more data packets transmitted on the at least one radio carrier to be covered by the feedback information,
a time window indicating the transmission time intervals of the first and the last transmitted of the one or more data packets transmitted on the at least one radio carrier to be covered by the feedback information.

The first HARQ process (the process in which the first of the one or more data packets was transmitted) and the last HARQ process (the process in which the last of the one or more data packets was transmitted) may be used for determining the HARQ codebook size. The communication device may further use the number of data packets provided per transmission time interval for determining the HARQ codebook size. For example, transmission modes using spatial multiplexing may cause reporting of more than one HARQ-ACK bit for a HARQ process in the feedback information. The communication device may determine the first HARQ process based on an indication of the last HARQ process. The communication device may determine the last HARQ process based on an indication of the first HARQ process. The first and the last HARQ process may determine the uplink control information the arrangement of HARQ feedback information in the HARQ codebook.

The feedback information for hybrid automatic repeat request relating to at least one of the radio carriers may comprise at least feedback information for data packets transmitted on the at least one radio carrier in the transmission time interval in which the scheduling information was received. The reported HARQ group acknowledgment in the uplink control information may indicate the state of a group of HARQ processes in the transmission time interval when scheduling information related to this group of HARQ processes was received. The communication device may include HARQ feedback information related to other HARQ processes if possible.

The method may further comprise bundling of feedback information relating to one or more of the one or more data packets. The bundling may be performed separately for data packets within each downlink transmission opportunity.

The method may further comprise determining the process of a hybrid automatic repeat request scheme to which the first transmitted of the one or more data packets transmitted on the at least one radio carrier relates based on one or more of:
- an indication of the process of a hybrid automatic repeat request scheme to which the last transmitted of the one or more data packets transmitted on the at least one radio carrier relates,
- the resource elements for the first transmission,
- free resource elements for the second transmission,
- subframe index for the second transmission,
- the number of data packets provided per transmission time interval,
- the outcome of a clear channel assessment procedure on resource elements of the first transmission,
- the number of data packets for which no feedback information has been provided in a previous uplink transmission opportunity.

The method may further comprise determining the process of a hybrid automatic repeat request scheme to which the last transmitted of the one or more data packets transmitted on the at least one radio carrier relates based on one or more of:
- an indication of the process of a hybrid automatic repeat request scheme to which the first transmitted of the one or more data packets transmitted on the at least one radio carrier relates,
- the number of resource elements for the first transmission,
- free resources elements for the second transmission,
- subframe index for the second transmission,
- the number of data packets provided per transmission time interval,
- the outcome of a clear channel assessment procedure on resource elements of the first transmission,
- the number of data packets for which no feedback information has been provided in a previous uplink transmission opportunity.

The subframe index for the second transmission on the shared resources may be used to delay the transmission of uplink control information as to ensure that additional HARQ feedback information gets available for the uplink control information.

Feedback information indicative of successful reception of a data packet may be provided only once per data packet. The communication device may feedback an "ACK" for a given HARQ-process and data packet only once. If the communication device has already transmitted an "ACK" for a given data block in a process, it shall transmit a "NACK" in a retransmission. Thus, feedback information indicative of not successful reception of a data packet may be provided if feedback information indicative of successful reception of the data packet was provided in previous feedback information.

The feedback information may be split in at least two parts and the at least two parts may be transmitted in different transmission time intervals of the uplink transmission opportunity. The uplink control information may be split if it is too large for transmission in single transmission time interval or subframe.

The scheduling information may comprise a notification of absence of user data in the second transmission. For example, to indicate whether the PUSCH in an LTE-based system carries user data or payload. In such a case no user data packet (transport block) is transmitted on the shared resources, and the communication device may provide only uplink control information on these resources. The notification may comprise an identifier associated with a specific modulation and coding scheme, for example MCS index $I_{MCS}=29$ in an LTE-based system. The communication device may use a predetermined modulation order, for example QPSK, in such a case. The communication device may include further uplink control information, for example aperiodic channel state information (CSI), if needed. HARQ feedback information and further uplink control information may be transmitted using resources according to the received scheduling information.

The communication device may interpret scheduling information related to the shared resources differently than usual if only control information is transmitted on the shared resources of a user data channel. The scheduling information may be indicative of a code division multiplexing scheme or code division multiplexing resource to be used in the transmission of at least a part of the uplink control information. The code division multiplexing scheme may relate to a scheme for interleaved frequency division multiple access (IFDMA) or block interleaved frequency division multiple access (B-IFDMA) across one or more transmission time intervals of the uplink transmission opportunity. In an embodiment there may be a specific B-IFDMA interlace which may support code division multiplexing across all transmission time intervals, similar to a "long PUCCH". The B-IFDMA interlace may be configured in a cell-specific way, and resource allocation information relating to the CDM B-IFDMA interlace may indicate that CDM is applied.

The code division multiplexing scheme may be based on a cyclic shift code and/or an orthogonal cover code. Different communication devices (users) may be separated based on the cyclic shift codes and/or cover codes. The code for code division multiplexing (CDM) may relate to a cyclic shift index of a de-modulation reference signal provided in the scheduling information. In an exemplary embodiment, PUCCH format 3 type of orthogonal cover code and reference signal arrangement in time is applied within the assigned B-IFDMA interlace.

The scheduling information may be provided in a uplink scheduling grant or a downlink scheduling grant.

Figure 5:
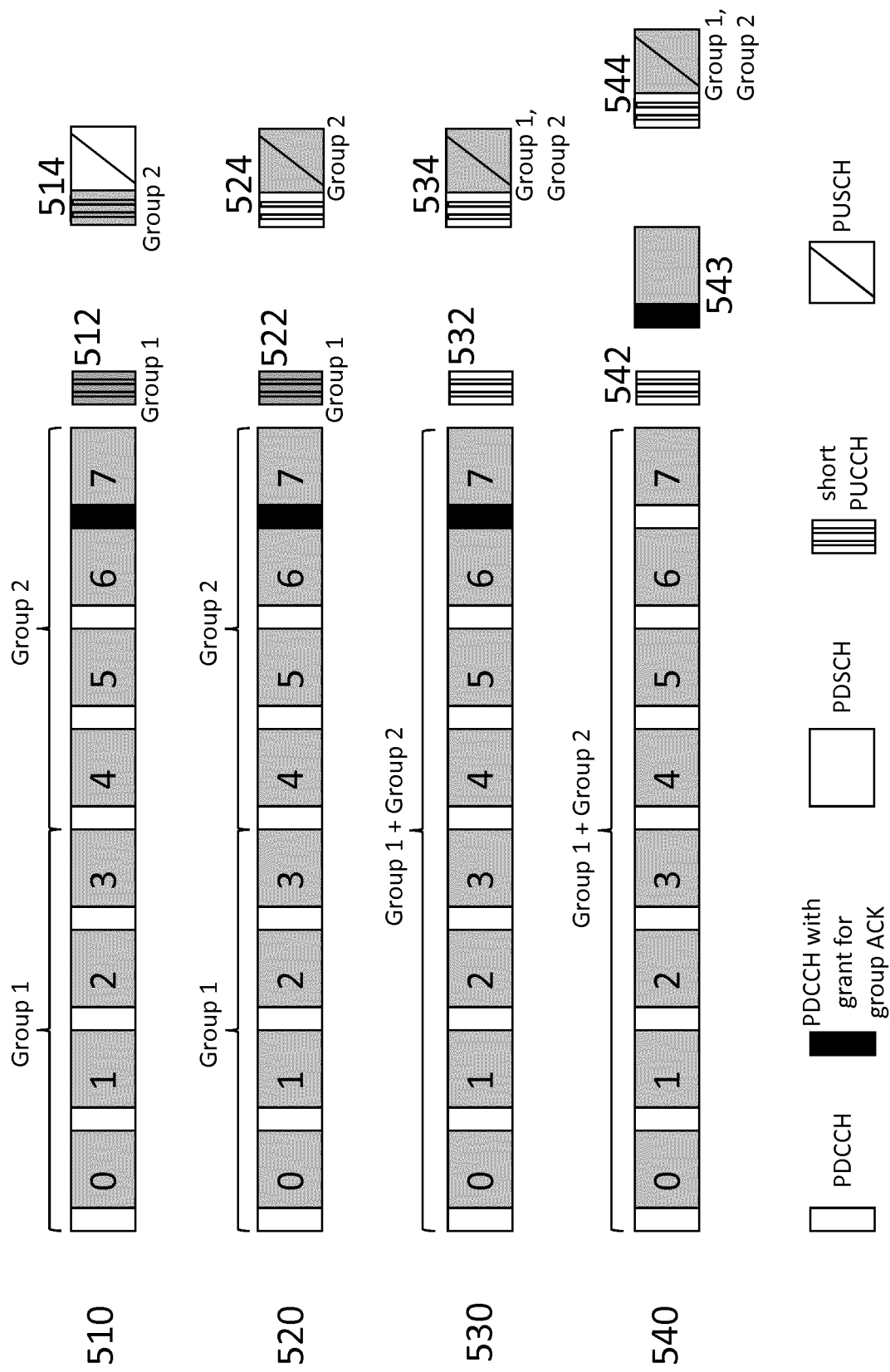
FIG. 5 shows a schematic diagram illustrating HARQ group acknowledgement transmission of uplink control information.

FIG. 5 shows a schematic diagram illustrating transmission of HARQ group acknowledgement from a communication device in a LTE-based communication system. Specifically, FIG. 5 shows exemplary techniques 510, 520, 530 and 530 for transmitting HARQ feedback information in one or more uplink transmission opportunities according to embodiments of the present invention.

HARQ processes 0 to 7 in the downlink transmission opportunities shown in FIG. 5 may be divided into two groups. The subdivision into two groups may be made on the basis whether HARQ feedback information for a process is available at the beginning of the first subframe in the following uplink transmission opportunity, for example, for potential transmission from the communication device in short PUCCHs 512, 522, 532, 544. In FIG. 5, a HARQ processing delay of four subframes is assumed. Accordingly, the group of HARQ processes for which HARQ feedback information is available at the beginning of the first subframe in the following uplink transmission opportunities extends in FIG. 5 from HARQ processes 0 up to and including HARQ processes 3, and is in the following referred to as Group 1. The other HARQ processes, HARQ processes 4 to 7 in FIG. 5, may form a second group, in the following referred to as Group 2.

In the first technique 510 scheduling information comprising a grant for group ACK transmission is provided on PDCCH or EPDCCH, for example, in the last subframe of the downlink transmission opportunity. This grant may permit transmission of HARQ feedback information related to HARQ processes of Group 1 in short PUCCH 512, and may further allow for transmission of HARQ feedback information related to HARQ processes of Group 2 in the short PUCCH of subframe 514 in the same or a following uplink transmission opportunity. Alternatively, transmission of short PUCCH 512 may not require a specific grant, and the grant may primarily control the transmission of HARQ feedback information related to HARQ processes of Group 2 in the short PUCCH of subframe 514.

In the second technique 520 scheduling information comprising a grant for group ACK transmission is provided on PDCCH, for example, in the last subframe of the downlink transmission opportunity. This grant may permit transmission of HARQ feedback information related to HARQ processes of Group 1 in short PUCCH 522, and may further allow for transmission of HARQ feedback information related to HARQ processes of Group 2 in the PUSCH of subframe 524 in the same or a following uplink transmission opportunity. The PUSCH in subframe 524 may or may not contain uplink user data. HARQ feedback information related to HARQ processes of Group 2 may be transmitted on predetermined PUSCH resources. The scheduling information may comprise a respective indication of the predetermined resources. Alternatively, transmission of short PUCCH 522 may not require a specific grant, and the grant may primarily control the transmission of HARQ feedback information related to HARQ processes of Group 2 in the short PUCCH of subframe 524.

In the third technique 530 scheduling information comprising a grant for group ACK transmission is provided on PDCCH, for example, in the last subframe of the downlink transmission opportunity. This grant may not permit transmission of HARQ feedback information in short PUCCH 532, but may allow for transmission of HARQ feedback information related to HARQ processes of Group 1 and Group 2 in the PUSCH of subframe 534 in the same or a following uplink transmission opportunity. The PUSCH in subframe 534 may or may not contain uplink user data. HARQ feedback information related to HARQ processes of Group 1 and Group 2 may be transmitted on predetermined PUSCH resources. The scheduling information may comprise a respective indication of the predetermined resources. The grant may permit at least additional transmission of HARQ feedback information related to HARQ processes of Group 1 and/or Group 2 on the short PUCCH of subframe 534 (not shown in FIG. 5). Alternatively, transmission of short PUCCH 532 may not require a specific grant, and the grant may primarily control the transmission of HARQ feedback information related to HARQ processes of Group 2 in the short PUCCH of subframe 534. However, HARQ feedback information for Group 1 and Group 2 may be transmitted in subframe 534, if the communication device drops transmission of short PUCCH 532 due to a failed CCA/LBT procedure.

It should be noted that transmission of short PUCCHs 512, 522, 532 and 542 may be allowed after the respective downlink transmission opportunity without explicit notification in a scheduling grant message. Transmission of short PUCCHs 512, 522, 532 and 542 may not require CCA/LBT at a communication device under certain regulations, for example, under SCS rules specified by ETSI.

In the fourth technique 540 scheduling information comprising a grant for group ACK transmission is not provided in a PDCCH of the downlink transmission opportunity relating to HARQ processes 0 to 7. Rather, the grant for group ACK transmission is provided only in subframe 543 of a subsequent uplink transmission opportunity. Thus, the access node can detect/process a potential transmission of HARQ feedback information for Group 1 on short PUCCH 542, and can decide, in dependence on the detection/processing step, on the group ACK scheduling information of the grant message provided in subframe 543. In the example of FIG. 5, no HARQ feedback information is transmitted/detected on short PUCCH 542, and the grant for group ACK transmission in subframe 543 comprises scheduling information for Group 1 and Group 2. The PUSCH in subframe 543 may or may not contain uplink user data. HARQ feedback information related to HARQ processes of Group 1 and Group 2 may be transmitted on predetermined PUSCH resources. The scheduling information may comprise a respective indication of the predetermined resources. Alternatively, the grant may permit at least additional transmission of HARQ feedback information related to HARQ processes of Group 1 and/or Group 2 on the short PUCCH of subframe 543.

The access node may implicitly signal a selection between the second and the third technique based on the HARQ processes addressed in the grant message. For example, addressing a HARQ process of Group 1 in a grant for group ACK transmission may imply transmission of HARQ feedback information according to the third technique.

A selection between the second and the third technique may alternatively or additionally be based on the outcome of a CCA/LBT procedure on resources of the short PUCCH following a downlink transmission opportunity. If the procedure fails and the communication device cannot access the short PUCCH channel, the communication device may transmit HARQ feedback information according to the third technique. Otherwise, it may transmit HARQ feedback information according to the second technique or the first technique.

It should further be noted that scheduling information comprising a grant for group ACK need not be provided in an UL grant in embodiments of the present invention. Rather, the access node may provide all information needed for transmission of HARQ group acknowledgment in any control information transmitted in the downlink transmission opportunity. The respective information may in particular be provided in downlink assignment information (DL grants) related to downlink data transmission in the downlink transmission opportunity. This information may in particular comprise scheduling information for HARQ group acknowledgment on short PUCHH, such as short PUCCH 512, 522, 532 and 542 in FIG. 5.

Figure 6:
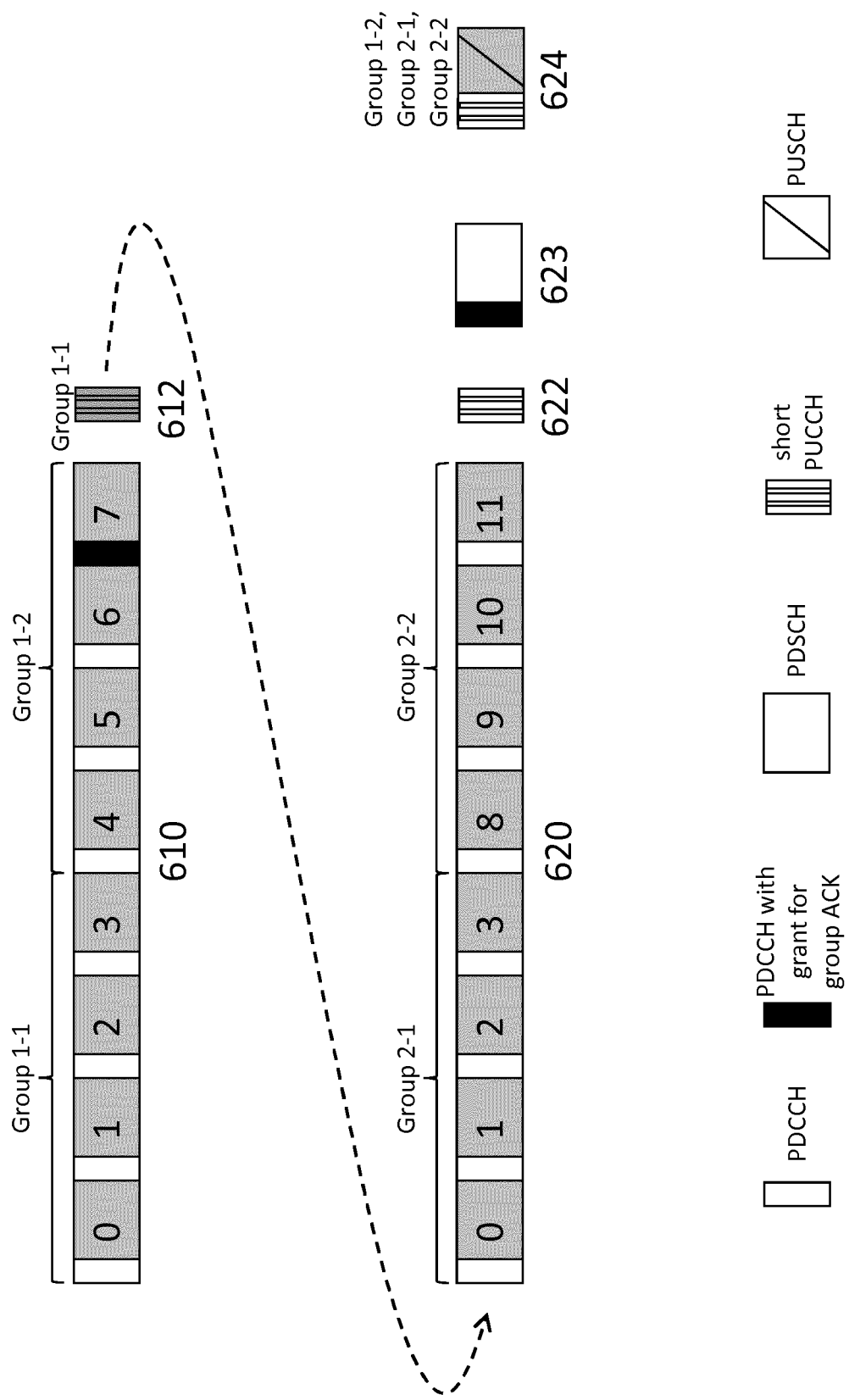
FIG. 6 shows a schematic diagram illustrating transmission of HARQ group acknowledgement comprising feedback information related to at least two downlink transmission opportunities.

FIG. 6 shows a schematic diagram illustrating transmission of HARQ group acknowledgement comprising feedback information related to at least two downlink transmission opportunities. Specifically, FIG. 6 shows a first downlink transmission opportunity 610 and a subsequent downlink transmission opportunity 620. Similar to FIG. 5, each downlink transmission opportunity is associated with two groups of HARQ processes (Group 1-1, Group 1-2) and (Group 2-1, Group 2-2), respectively.

In the example of FIG. 6, scheduling information comprising a grant for group ACK transmission is provided on PDCCH in the last subframe of the first downlink transmission opportunity 610. This grant may permit transmission of HARQ feedback information related to HARQ processes 0, 1, 2 and 3 of Group 1-1 in short PUCCH 612. However, HARQ feedback information related to processes 4, 5, 6, and 7 of Group 1-2 is not provided or detected within the same uplink transmission opportunity. Rather, HARQ feedback information related to processes of Group 1-2 is provided in the example of FIG. 6 only after the second downlink transmission opportunity 620 according to the forth technique in FIG. 5. In the example of FIG. 6, the grant for group ACK transmission is provided in subframe 623 of a subsequent uplink transmission opportunity. Thus, the access node can detect/process a potential transmission of HARQ feedback information for Group 1-2 and/or Group 2-1 on short PUCCH 622, and can decide, in dependence on the detection/processing step, on the group ACK scheduling information of the grant message provided in subframe 623.

In the example of FIG. 6, no HARQ feedback information is transmitted/detected on short PUCCH 622, and the grant for group ACK transmission in subframe 623 comprises scheduling information for Group 1-2, Group 2-1 and Group 2-2. HARQ processes 4, 5, 6 and 7 are suspended due to missing HARQ feedback information after the downlink transmission opportunity 610, and the number of active HARQ processes is dynamically extended by HARQ processes 8, 9, 10 and 11 of Group 2-2 associated with data transmissions in the second half of downlink transmission opportunity 620. The HARQ-ACK codebook size, that is the size of a container intended to carry HARQ feedback information, may be adjusted according to the number of active HARQ processes. Another approach is to adjust it according to the number HARQ processes supported by the communication device or according to a number HARQ processes configured by the access node. In case a communication device is only providing HARQ feedback information for a part of the currently active or configured HARQ processes, it may provide a NACK indicating a failed transmission for unused HARQ processes.

Figure 7:
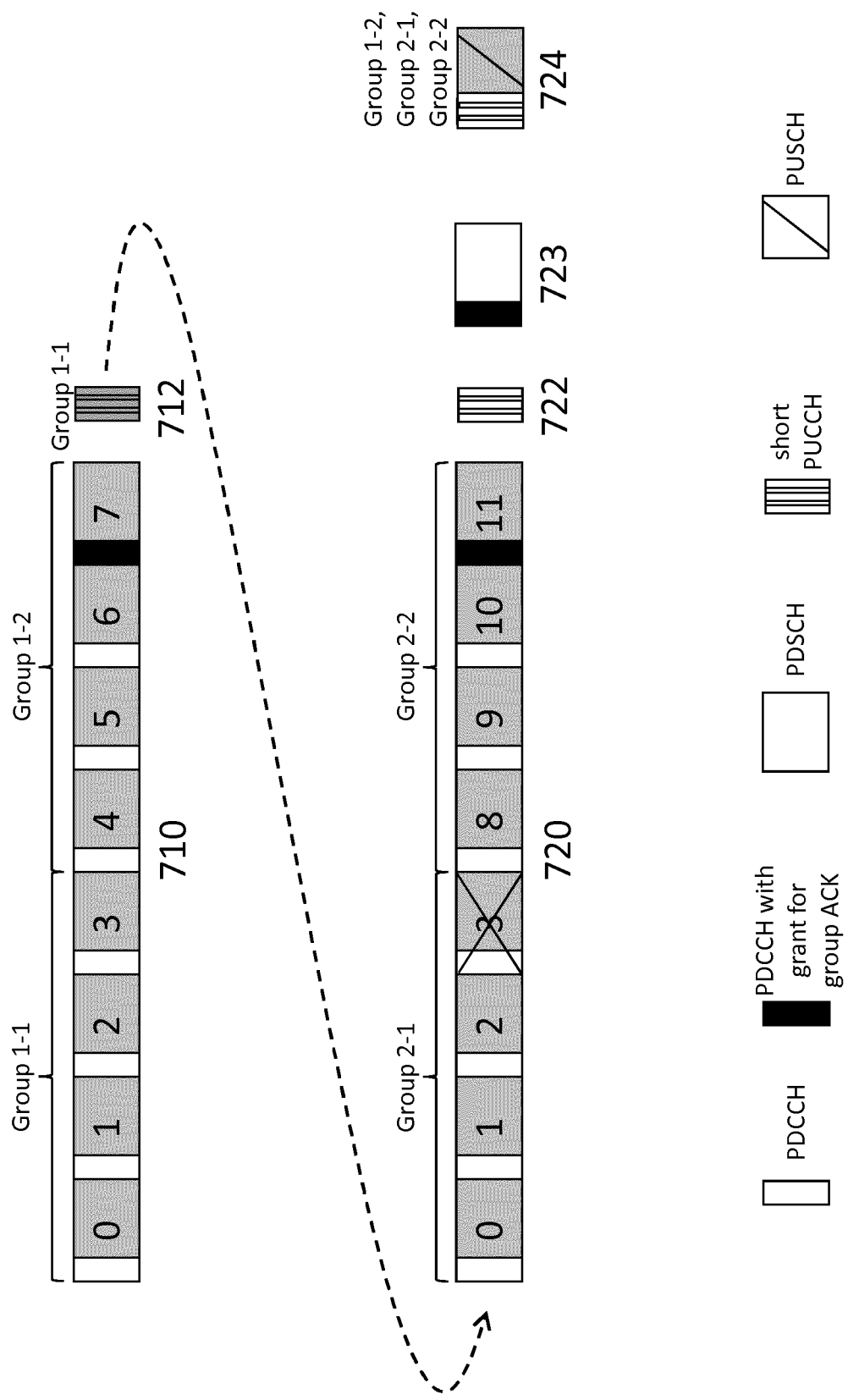
FIG. 7 shows a schematic diagram illustrating an error case in the transmission of HARQ group acknowledgement.
Figure 8:
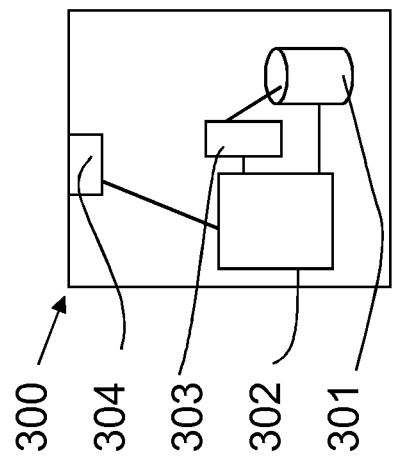
FIG. 8 shows a schematic diagram of an example control apparatus.

FIG. 7 shows a schematic diagram illustrating an error case in the transmission of HARQ group acknowledgement. Specifically, FIG. 7 shows the signaling diagram of FIG. 6, in which the PDCCH transmission in the subframe associated with HARQ process 3 in downlink transmission opportunity 720 has failed, that is, the communication device could not detect the scheduling information for PDSCH transmission in this subframe. In the example of FIG. 7, it is assumed that this scheduling information was intended to notify the communication device of a transmission of a new data block (transport block) in HARQ process 3. In a LTE-based system an access node may notify a communication device of a new data block in a HARQ process by toggling the value of a new data indicator (NDI) in the downlink assignment information. It is further assumed, that the communication device has acknowledged on short PUCCH 712 successful detection of the preceding data block (transport block) in HARQ process 3 (i.e. third subframe in Group 1-1 in 720). In the example of FIG. 7, no HARQ feedback information is transmitted/detected on short PUCCH 722 due to CCA/LBT problems, which caused the communication device to drop HARQ feedback transmission on PUCCH 722. In such a case, the access node cannot determine why it could not detect HARQ feedback information on PUCCH 722. Possible reasons are:

The communication device did not transmit HARQ feedback information due to CCA/LBT problems.

The communication device missed downlink assignment information.

The communication device provided HARQ feedback information on PUCCH 722, but the access node failed to detect the HARQ feedback information.

The access node may instruct the communication device in the group ACK scheduling information provided in subframe 723 to retransmit the available HARQ feedback information. The communication device would then repeat the acknowledgement for the preceding data block in HARQ process 3, but the access node would understand this as acknowledgement related to the transmission of the new data block in HARQ process 3 of downlink communication opportunity 720.

In other words, PDCCH detection problems may cause on unlicensed spectrum NACK-to-ACK (or DTX-to-ACK) errors, where the access node determines an ACK in a HARQ process when the communication device should correctly transmit a NACK (or DTX indicating that communication device assumes that the access node did not send on PDSCH).

For solving this problem the communication device may in an embodiment report an ACK denoting successful detection of a data block only once (or allow only one ACK transmission per received DL assignment per HARQ process), and may send a NACK indicating not successful detection in retransmissions of the HARQ feedback information related to this data block.

However, it may be desirable to provide the correct HARQ feedback information also in retransmissions. Retransmission of correct HARQ feedback information may be supported in a further embodiment, in which the communication devices includes in the HARQ feedback information additional information indicative of the data packet the ACK/NACK HARQ feedback information relates. Reporting of the additional information by the communication device may be configurable. The additional information may be included in a message of predetermined size. The communication device may include the additional information only when it is reporting an ACK for successful detection of a data packet. The additional information may be included separately for each HARQ process. The additional information may be indicative of a sequence number of the data packet in the process. The additional information may comprise at least the least significant bit of such a sequence number. The additional information may in particular comprise the new data indicator (NDI) provided in the downlink assignment information for the data packet. The additional information may comprise information indicative of the time when the access point provided the downlink assignment information. The additional information may comprise a check value related to the downlink assignment information or to the data packet.

The additional information may be common to all HARQ processes. The communication device may, for example, include a parameter in the HARQ-ACK feedback message which may provide an indication of the number of PDSCHs received during a predetermined time window. In an example, the communication device may have received 7 PDCCHs (and related PDSCHs), and the communication device could indicate this value (=7) by e.g. by two or more bits (mod-function can be used to adjust the number of feedback bits) in the HARQ-ACK feedback message. The access node may detect the occurrence of PDDCH failure events based on this information or similar consistency information, For solving/avoiding the problem the access point may ensure a sufficiently robust signalling of the downlink assignment information, so as to ensure a consistent mapping between HARQ feedback information and HARQ processes on both sides, the communication device and the access node. The access node may for example indicate the HARQ processes for which HARQ feedback information is requested. Such an indication may in particular be used for avoiding retransmission of an ACK in a HARQ process. The access node may provide this indication in the downlink scheduling information for group ACK transmission, for example by means of a respective downlink assignment index. Another motivation behind such signalling may be to reduce the payload size of the HARQ feedback information.

An error-detection code, such as a Cyclic Redundancy Check (CRC), may be used when HARQ feedback information is communicated between the communication device and the access node to avoid misdetection problems.

Spatial and time domain bundling may be employed in the HARQ feedback information so as to reduce the payload, that is number of reported ACKs or NACKs, in the HARQ feedback information. The smaller payload size may be used for a more robust encoding or modulation of the HARQ feedback information.

It should be understood that each block of the flowchart of the Figures and any combination thereof may be implemented by various means or their combinations, such as hardware, software, firmware, one or more processors and/or circuitry.

The method may be implemented on a mobile device as described with respect to FIG. 2 or control apparatus as shown in FIG. 7. FIG. 7 shows an example of a control apparatus for a communication system, for example to be coupled to and/or for controlling a station of an access system, such as a RAN node, e.g. a base station, (e) node B or 5G AP, a central unit of a cloud architecture or a node of a core network such as an MME or S-GW, a scheduling entity, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise providing configuration information for uplink control channels and uplink data channels.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE networks, similar principles may be applied in relation to other networks and communication systems, for example, 5G networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
receiving one or more data packets wirelessly in one or more downlink transmission opportunities on one or more radio carriers;
receiving scheduling information comprising an indication of uplink control information to be transmitted related to at least one of the one or more data packets;
causing wireless transmission of the uplink control information in an uplink transmission opportunity;
wherein the transmission of the uplink control information comprises a first transmission using one or more resource elements reserved for uplink control information and a second transmission using one or more resource elements shared between uplink control information and uplink user data;
wherein the scheduling information comprises an indication controlling use of the first transmission and the second transmission in the transmission of the uplink control information;
wherein the uplink control information comprises feedback information of a hybrid automatic repeat request scheme relating to at least one of the radio carriers and one or more data packets transmitted on the at least one radio carrier in one or more downlink transmission opportunities; and
wherein the scheduling information comprises an indication of one or more processes of the hybrid automatic repeat request scheme indicating one or more data packets transmitted on the at least one radio carrier to be covered by the feedback information and comprises a time window indicating transmission time intervals of a first transmitted and a last transmitted of the one or more data packets transmitted on the at least one radio carrier to be covered by the feedback information.

2. A method according to claim 1, wherein at least a part of the uplink control information is multiplexed with uplink user data in the second transmission.

3. A method according to claim 1, wherein the feedback information in the hybrid automatic repeat request scheme comprises an indication of a number of data packets or transmissions of scheduling information transmitted in the processes to which the feedback information relates.

4. A method according to claim 1, wherein the scheduling information comprises at least one of:
an indication of the at least one of the radio carriers,
an indication of a process of the one or more processes of the hybrid automatic repeat request scheme indicating the last transmitted of the one or more data packets transmitted on the at least one radio carrier to be covered by the feedback information, or
an indication of a process of the one or more processes of the hybrid automatic repeat request scheme indicating the first transmitted of the one or more data packets transmitted on the at least one radio carrier to be covered by the feedback information.

5. A method according to claim 1, comprising bundling of feedback information relating to one or more of the one or more data packets, wherein bundling is performed separately for data packets within each downlink transmission opportunity.

6. A method according to claim 1, comprising determining the process of the hybrid automatic repeat request scheme to which the first transmitted of the one or more data packets transmitted on the at least one radio carrier relates based on one or more of:
an indication of a process of the one or more processes of the hybrid automatic repeat request scheme to which the last transmitted of the one or more data packets transmitted on the at least one radio carrier relates, the resource elements for the first transmission, free resource elements for the second transmission, subframe index for the second transmission, or a number of data packets provided per transmission time interval.

7. A method according to claim 1, wherein information indicative of not successful reception of a data packet is provided in the feedback information in response to information indicative of successful reception of the data packet was provided in previous feedback information.

8. A method comprising:
causing wireless transmission of one or more data packets in one or more downlink transmission opportunities on one or more radio carriers;
causing transmission of scheduling information comprising an indication of uplink control information to be transmitted related to at least one of the one or more data packets;
receiving the uplink control information wirelessly in an uplink transmission opportunity;
wherein the receiving of the uplink control information comprises receiving a first transmission using one or more resource elements reserved for uplink control information, and receiving a second transmission using one or more resource elements shared between uplink control information and uplink user data;
wherein the scheduling information comprises an indication controlling use of the first transmission and the second transmission in the transmission of the uplink control information;
wherein the uplink control information comprises feedback information of a hybrid automatic repeat request scheme relating to at least one of the radio carriers and one or more data packets transmitted on the at least one radio carrier in one or more downlink transmission opportunities; and
wherein the scheduling information comprises an indication of one or more processes of the hybrid automatic repeat request scheme indicating one or more data packets transmitted on the at least one radio carrier to be covered by the feedback information and comprises a time window indicating transmission time intervals of a first transmitted and a last transmitted of the one or more data packets transmitted on the at least one radio carrier to be covered by the feedback information.

9. A method according to claim 8, wherein at least a part of the uplink control information is transmitted in the second transmission, without uplink user data being included in the second transmission.

10. A method according to claim 8, wherein the feedback information in a process of the hybrid automatic repeat request scheme comprises an indication to which data packet transmitted in the process the feedback information relates to.

11. An apparatus comprising:
at least one processor; and
at least one memory including computer program code, the at least one memory and the computer program code configured, with the at least one processor, to cause the apparatus to perform at least the following:
receive one or more data packets wirelessly in one or more downlink transmission opportunities on one or more radio carriers;
receive scheduling information comprising an indication of uplink control information to be transmitted related to at least one of the one or more data packets;
cause wireless transmission of the uplink control information in an uplink transmission opportunity;
wherein the transmission of the uplink control information comprises a first transmission using one or more resource elements reserved for uplink control information and a second transmission using one or more resource elements shared between uplink control information and uplink user data;
wherein the scheduling information comprises an indication controlling use of the first transmission and the second transmission in the transmission of the uplink control information;
wherein the uplink control information comprises feedback information of a hybrid automatic repeat request scheme relating to at least one of the radio carriers and one or more data packets transmitted on the at least one radio carrier in one or more downlink transmission opportunities; and
wherein the scheduling information comprises an indication of one or more processes of the hybrid automatic repeat request scheme indicating one or more data packets transmitted on the at least one radio carrier to be covered by the feedback information and comprises a time window indicating transmission time intervals of a first transmitted and a last transmitted of the one or more data packets transmitted on the at least one radio carrier to be covered by the feedback information.

12. An apparatus comprising:
at least one processor; and
at least one memory including computer program code, the at least one memory and the computer program code configured, with the at least one processor, to cause the apparatus to perform at least the following:
cause wireless transmission of one or more data packets in one or more downlink transmission opportunities on one or more radio carriers;
cause transmission of scheduling information comprising an indication of uplink control information to be transmitted related to at least one of the one or more data packets; and receive the uplink control information wirelessly in an uplink transmission opportunity;
wherein the receiving of the uplink control information comprises receiving a first transmission using one or more resource elements reserved for uplink control information, and receiving a second transmission using one or more resource elements shared between uplink control information and uplink user data;
wherein the scheduling information comprises an indication controlling use of the first transmission and the second transmission in the transmission of the uplink control information;
wherein the uplink control information comprises feedback information of a hybrid automatic repeat request scheme relating to at least one of the radio carriers and one or more data packets transmitted on the at least one radio carrier in one or more downlink transmission opportunities; and
wherein the scheduling information comprises an indication of one or more processes of the hybrid automatic repeat request scheme indicating one or more data packets transmitted on the at least one radio carrier to be covered by the feedback information and comprises a time window indicating transmission time intervals of a first transmitted and a last transmitted of the one or more data packets transmitted on the at least one radio carrier to be covered by the feedback information.

13. A computer program product comprising a non-transitory computer-readable medium, comprising software code portions for performing the following when said software code portions are run on a computer:
receiving one or more data packets wirelessly in one or more downlink transmission opportunities on one or more radio carriers;
receiving scheduling information comprising an indication of uplink control information to be transmitted related to at least one of the one or more data packets; and
causing wireless transmission of the uplink control information in an uplink transmission opportunity;
wherein the transmission of the uplink control information comprises a first transmission using one or more resource elements reserved for uplink control information and a second transmission using one or more resource elements shared between uplink control information and uplink user data;
wherein the scheduling information comprises an indication controlling use of the first transmission and the second transmission in the transmission of the uplink control information;
wherein the uplink control information comprises feedback information of a hybrid automatic repeat request scheme relating to at least one of the radio carriers and one or more data packets transmitted on the at least one radio carrier in one or more downlink transmission opportunities; and
wherein the scheduling information comprises an indication of one or more processes of the hybrid automatic repeat request scheme indicating one or more data packets transmitted on the at least one radio carrier to be covered by the feedback information and comprises a time window indicating transmission time intervals of a first transmitted and a last transmitted of the one or more data packets transmitted on the at least one radio carrier to be covered by the feedback information.

14. A computer program product comprising a non-transitory computer-readable medium, comprising software code portions for performing the following when said software code portions are run on a computer:
causing wireless transmission of one or more data packets in one or more downlink transmission opportunities on one or more radio carriers;

causing transmission of scheduling information comprising an indication of uplink control information to be transmitted related to at least one of the one or more data packets; and receiving the uplink control information wirelessly in an uplink transmission opportunity;

wherein the receiving of the uplink control information comprises receiving a first transmission using one or more resource elements reserved for uplink control information, and receiving a second transmission using one or more resource elements shared between uplink control information and uplink user data;

wherein the scheduling information comprises an indication controlling use of the first transmission and the second transmission in the transmission of the uplink control information;

wherein the uplink control information comprises feedback information of a hybrid automatic repeat request scheme relating to at least one of the radio carriers and one or more data packets transmitted on the at least one radio carrier in one or more downlink transmission opportunities; and wherein the scheduling information comprises an indication of one or more processes of the hybrid automatic repeat request scheme indicating one or more data packets transmitted on the at least one radio carrier to be covered by the feedback information and comprises a time window indicating transmission time intervals of a first transmitted and a last transmitted of the one or more data packets transmitted on the at least one radio carrier to be covered by the feedback information.

15. A method according to claim 1, comprising determining the process of the hybrid automatic repeat request scheme to which the data packet transmitted first of the one or more data packets transmitted on the at least one radio carrier relates based on the outcome of a clear channel assessment procedure on resource elements of the first transmission in a system operated in unlicensed spectrum.

16. A method according to claim 1, comprising determining the process of the hybrid automatic repeat request scheme to which the data packet transmitted first of the one or more data packets transmitted on the at least one radio carrier relates based on a number of data packets for which no feedback information has been provided in a previous uplink transmission opportunity in a system operated in unlicensed spectrum.

\* \* \* \* \*